July 2, 1940.  W. G. O. STIEBER  2,206,373
JOINT
Filed June 10, 1936
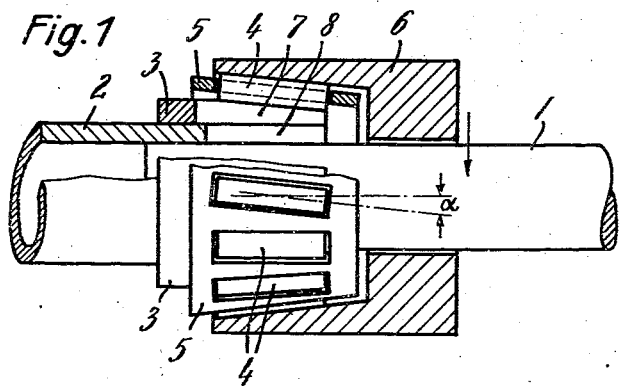
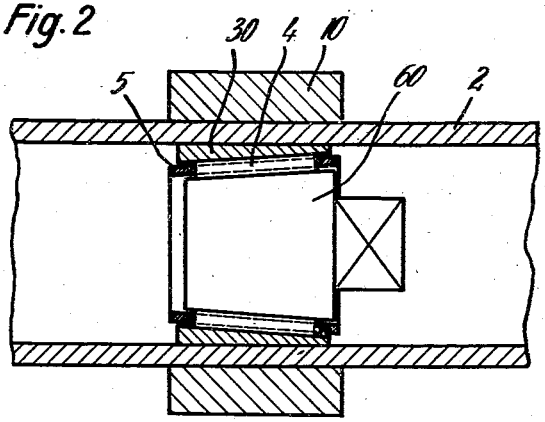
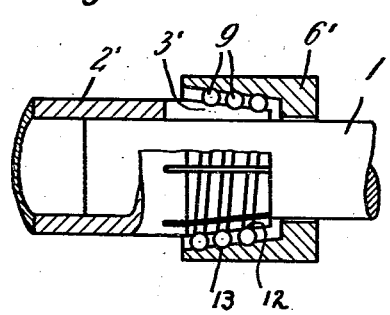
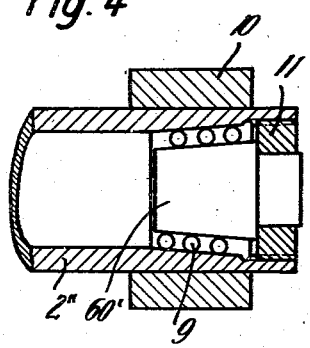
Inventor
Wilhelm Gustav Otto Stieber
per Karl A. ...
Attorney.

Patented July 2, 1940

2,206,373

UNITED STATES PATENT OFFICE 2,206,373

JOINT

Wilhelm Gustav Otto Stieber, Korntal, near Stuttgart, Germany

Application June 10, 1936, Serial No. 84,502
In Germany June 18, 1935

5 Claims. (Cl. 287—58)

The present invention relates to a method and means for making rigid yet disconnectable connections, particularly for rigidly yet disconnectably connecting machine parts of round cross sectional configuration such as shafts, tubes, and the like or parts of any configuration to such elements.

An object of the present invention resides in the provision of a connection of the type described having high frictional engaging pressure and requiring only little effort for connecting and disconnecting.

Another object of the present invention is to provide a disconnectable coupling for shafts, which transmits the whole torque from one shaft to the connected shaft by frictional engagement and which has no keys, bolts or like definite connecting members and which does not require special and costly machining of the ends of the shafts.

A further object of this invention resides in the provision of a disconnectable connection of machine elements of circular cross sectional configuration, which assures exact centering of the connected parts.

Another object of this invention resides in the provision of a connection for reliably securing discs, wheels, levers, and the like to shafts, axles or rods, for reliably connecting the individual parts of a built up crank shaft, particularly for tightly connecting tube ends and many other elements used for engineering purposes.

According to the present invention, a clamping means is used for disconnectably yet rigidly and reliably connecting a plurality of members, which members are provided with cone-shaped parts which are of male nature in one half of said members and of female nature in the other half of said members and which fit into one another. In between two corresponding cone-shaped parts, rolling means are provided; in addition, means are provided for pushing the cone-shaped parts into one another.

Further and other objects of the present invention will be hereinafter set forth in the accompanying specification and claims and shown in the drawing which, by way of illustration, shows what I now consider to be a preferred embodiment of my invention.

In the drawing:

Fig. 1 is a part cross sectional showing of a connection according to the present invention.

Fig. 2 is a part cross sectional showing of a modification of a connection according to the present invention.

Fig. 3 is a part cross sectional showing of another modification of a connection according to the present invention.

Fig. 4 is a part cross sectional showing of another application of the present invention.

Like parts are designated by like numerals in all figures of the drawing.

Referring more particularly to Fig. 1 of the drawing: cylindrical part 1 carries hollow part 2 which snugly fits over part 1; instead of providing a cylindrical surface, the connection between parts 1 and 2 may be of conical configuration or a thread or tooth connection may be used. Hollow part 2 carries an annular part 3, part of the exterior surface of which is cone-shaped. The hollow body 2 and the annular part 3 are each provided with a plurality of axial slots 8 and 7, respectively. The parts left in between the slots are, therefore, slightly resilient. Adjacent to the cone-shaped part 3, rolls 4 are provided which are held in place by means of a cage 5. Cage 5 is shown in section in the upper part of Fig. 1.

Rolls 4 are inclined towards the center line of the system and are also inclined with respect to the longitudinal axis of the system, the latter inclination amounting to an angle α; in other words, rolls 4 are set twisted with respect to the central axis of the system. Rolls 4 are held in the described position by means of cage 5. One or more rolls may be arranged in one clearance of cage 5. In the drawing, one roll is shown in one clearance for simplicity's sake. A socket 6 having a cone-shaped interior is arranged around the annular member or ring 3 and the rolls 4. The inclination of the cone-shaped interior of socket 6 conforms with the inclination of the cone-shaped part of member 3 and the rolls 4. Rolls 4 may be made cylindrical or cone-shaped. For simplicity's sake, they are shown cylindrical in the drawing. With cylindrical rolls, the cone-shaped surfaces of parts 3 and 6 must be made parallel.

If socket 6 is revolved, rolls 4 exert a screw-action. Socket 6 is then also moved axially towards part 3 and exerts a pressure in radial direction. This pressure increases upon revolving movement of socket 6 towards part 3. This causes the segments of part 3 in between slots 8 to be pressed towards the hollow cylinder 2, and said cylinder is pressed on to part 1.

If the thickness of cylinder 2 and of part 3 is comparatively small, slots 7 and 8 may be omitted. Parts 3 and 2 are then also pressed towards part 1. The pressure exerted is exceedingly high because of the rolling principle used and because the rolls 4 may be arranged on the whole circumference.

Due to the pressure between parts 1 and 2, a highly effective high tension connection is created. The proportion of the locking torque to the power transmission torque can be determined within wide limits by proper choice of the inclination of the cone surfaces and of the angle α.

Socket 6 may be held in place and prevented from turning, as well with respect to part 1 as to part 2, by any well known and conventional fastening means which are not shown in the drawing because they do not form part of the present invention.

Socket 6 and part 3 may also be screwed into one another, the thread of such screw having approximately the pitch necessitated by the inclination of the rolls. A falling apart of the individual members is, thereby, prevented when disassembling the system.

If a disc or wheel or the like must be connected to part 1, the hollow body 2 must be made part of said disc or wheel. If two cylindrical bodies, for instance, the ends of rod-like parts, must be connected, body 2 is constructed as a bushing which is pushed over the ends of the rods to be connected and the clamp consisting of members 3, 4, 5, and 6 is applied at both ends of said bushing.

When omitting slots 8, hollow body 2 is pressed so much towards part 1 that these two parts sit completely tight on one another. The connection as described can, therefore, be used for all purposes where a completely tight connection is required, for example, for connecting tubes operating at great internal liquid or gas pressure.

In many cases, parts 2 and 3 may be constructed as one body.

Fig. 2 shows a modification of the present invention in which pressure is exerted from the interior towards the outer parts. 60 is a cone-shaped rotund body which is revolved and axially moved for generating the desired pressure. The arrangement of rolls 4 and cage 5 is fundamentally the same as in Fig. 1. The pressure acts on ring 30 which has a cone-shaped interior surface and acts through ring 30 on hollow body 2 which is pressed towards body 10. Ring 30 may be omitted and body 2 itself be internally provided with a conical surface adjacent to body 10.

In the embodiment of my invention according to Fig. 3 of the drawing, part of the clamping means, namely, the part designated by numeral 3 in Fig. 1 is formed by the part which corresponds to part 2 in Fig. 1. Instead of rolls 4, balls 9 are used. For holding the rolls in place, the cone-shaped part 3' of part 2' and also the interior surface of socket 6' are provided with one or a plurality of grooves 12 and 13 which are arranged in screw-like manner.

Instead of providing such grooves, socket 6' may be screwed on to cone 3' or other means may be provided for effecting axial movement of part 6' with respect to part 2'. This principle is used in the embodiment of my invention which is illustrated in Fig. 4. The interior cone 60' corresponds to the cone 60 in Fig. 2.

The hollow body 2" has a cone-shaped interior surface. Part 10 is to be fastened to body 2". A ring 11 is screwed into body 2" and adapted to move cone 60' into body 2". Balls 9 are provided in between the surface of cone 60' and the cone-shaped interior surface of part 2". Instead of creating the connecting pressure by screw action, cone 60' may be forced into part 2", for example, by means of a hydraulic press and held in position by the ring 11.

The mechanism consisting of parts 3, 4, 5, and 6 shown in Fig. 1 or the mechanism comprising parts 60, 4, 5, and 30 shown in Fig. 2 may also be advantageously used as an adjustable measuring gauge for measuring interior or outside diameters. The expansible part 3 or 30 forms the measuring member of such a device, whereas the other parts serve as adjusting members and members 6 or 60 as indicating member the extent of movement of which indicates the difference of the diameter of member 2 and the inside diameter of part 3 or the outside diameter of part 30. The parts 3, 4, 5, 6 or 60, 4, 5, 30 may be modified according to Figures 3 and 4 of the drawing.

While I believe the above described embodiments of my invention to be preferred embodiments, I wish it to be understood that I do not desire to be limited to the exact details of method, design, and construction shown and described, for obvious modifications will occur to a person skilled in the art.

What I claim is:

1. Clamping means for disconnectably pressing together two members, each of which is provided with a gliding surface, said gliding surfaces being adapted to glidingly cooperate with one another, said clamping means comprising a part having a cone-shaped surface and being adapted to permanently glidingly cooperate with one of said members, a plurality of rollers permanently located adjacent to said cone-shaped surface and twisted with respect to the center line of said part having a cone-shaped surface for allowing axial movement of said rollers, and another part also having a cone-shaped surface which is adjacent to said rollers and which is adapted to permanently force said rollers on to the cone-shaped surface of said first mentioned part upon axial movement of said parts with respect to one another.

2. Coupling means for disconnectably coupling together a plurality of members having adjacent gliding surfaces, said coupling means comprising a cone part adapted to cooperate with one of said members, another cone part adapted to cooperate with said first mentioned cone part, rolling means located in between said cooperating cone parts, and means for forcing said last mentioned cone part on to said first mentioned cone part, whereby said last mentioned cone part presses said rolling means to said first mentioned cone part, and said first mentioned cone part presses the member with which it cooperates to another of said members, and a reliable connection of said pressed together members is obtained.

3. Joint means for tightly and disconnectably joining tube ends which are located within one another, said means comprising an annular member which is situated around the outer of said tube ends and which has a cone-shaped exterior surface, a socket situated around said annular member and having an interior cone-shaped surface, and rolling means located between said cone-shaped surfaces, whereby, upon axial movement towards and into one another of said socket and said annular member, said annular member is pressed on to the end of the outer tube, and the end of said outer tube is tightly pressed on to the interior tube.

4. Joint means for tightly and disconnectably joining tube ends which are located within one another, said means comprising an annular member which is situated around the outer of said tube ends and which has a cone-shaped exterior surface, a socket situated around said annular member and having an interior cone-shaped surface, rolling means located between said cone-shaped surfaces, and means for pushing said socket into and over said annular member, whereby, upon axial movement towards and into one another of said socket and said annular member, said annular member is pressed on to the end of the outer tube, and the end of said outer tube is tightly pressed on to the interior tube.

5. A coupling means for disconnectably coupling together a plurality of members which are disposed within one another and have adjacent gliding surfaces, said coupling means comprising a cone part which is adjacent to and adapted to permanently, pressingly cooperate with one of said members, another cone part which is axially displaceable with respect to said first mentioned cone part, and axially and circumferentially displaceable rolling means permanently located in between said cone parts, whereby, upon axial displacement of said cone parts with respect to one another, said other cone part presses said rolling means to said first mentioned cone part, and said first mentioned cone part presses the member to which it is adjacent to another of said members, and a reliable connection of said pressed together members is obtained.

WILHELM GUSTAV OTTO STIEBER.